(12) United States Patent
Pratt et al.

(10) Patent No.: US 9,122,414 B2
(45) Date of Patent: Sep. 1, 2015

(54) METHODS AND SYSTEMS FOR OPTIMIZING A PROCESS OF ARCHIVING AT LEAST ONE BLOCK OF A VIRTUAL DISK IMAGE

(75) Inventors: Ian Pratt, Cambridge (GB); Jeffrey Muir, Logan Village (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 100 days.

(21) Appl. No.: 12/967,260

(22) Filed: Dec. 14, 2010

(65) Prior Publication Data

US 2011/0161301 A1 Jun. 30, 2011

Related U.S. Application Data

(60) Provisional application No. 61/286,339, filed on Dec. 14, 2009.

(51) Int. Cl.
| | |
|---|---|
| *G06F 7/00* | (2006.01) |
| *G06F 17/00* | (2006.01) |
| *G06F 13/00* | (2006.01) |
| *G06F 3/06* | (2006.01) |

(52) U.S. Cl.
CPC ............ *G06F 3/0664* (2013.01); *G06F 3/0619* (2013.01); *G06F 3/0649* (2013.01); *G06F 3/0683* (2013.01)

(58) Field of Classification Search
CPC .......... G06F 2212/65; G06F 2212/657; G06F 3/0604; G06F 3/0619; G06F 3/0649; G06F 3/0683
USPC ................. 707/639, 665, 667, 694, 715, 756; 711/100, 114, 156, 158, 161–162
See application file for complete search history.

(56) References Cited

U.S. PATENT DOCUMENTS

| | | |
|---|---|---|
| 2006/0053139 A1 | 3/2006 | Marzinski et al. |
| 2006/0242179 A1 | 10/2006 | Chen et al. |
| 2007/0208788 A1* | 9/2007 | Chakravarty et al. ......... 707/204 |

(Continued)

FOREIGN PATENT DOCUMENTS

| | | |
|---|---|---|
| EP | 1 826 662 | 8/2007 |
| KR | 10-2003-0043837 | 6/2003 |

(Continued)

OTHER PUBLICATIONS

Chinese Office Action on 201080063607.4 dated Feb. 17, 2014.
Chinese Office Action on 201080063607.4 dated Mar. 1, 2013.
Chinese Office Action on 201080063607.4 dated Sep. 23, 2013.
Supplemental European Search Report on 10841539.9 dated Jun. 5, 2013.

(Continued)

*Primary Examiner* — Jason Liao
*Assistant Examiner* — Berhanu Mitiku
(74) *Attorney, Agent, or Firm* — Foley and Lardner LLP; John D. Lanza (57) ABSTRACT

A system for optimizing a process of archiving at least one block of a virtual disk image includes a file system analysis component and an archiving component. The file system analysis component executes on a first physical computing device and identifies a plurality of blocks storing data comprising a file in a virtual disk image file. The archiving component executes on the first physical computing device, identifies a difference disk file storing an identification of a modification to the identified plurality of blocks storing data comprising the file, determines whether to archive the file, and transmits, to a second physical computing device, the plurality of blocks storing data comprising the file.

14 Claims, 7 Drawing Sheets

(56) References Cited

U.S. PATENT DOCUMENTS

| | | | |
|---|---|---|---|
| 2009/0007105 A1* | 1/2009 | Fries et al. ........................ | 718/1 |
| 2009/0157756 A1 | 6/2009 | Sanvido | |
| 2009/0228669 A1* | 9/2009 | Slesarev et al. ............... | 711/161 |
| 2010/0070474 A1* | 3/2010 | Lad .............................. | 707/624 |

FOREIGN PATENT DOCUMENTS

| | | |
|---|---|---|
| KR | 10-2006-0092964 B1 | 3/2007 |
| KR | 10-2009-0018992 | 2/2009 |

OTHER PUBLICATIONS

Chinese Decision of Rejection on 201080063607.4 dated Jun. 5, 2014.
International Preliminary Report on Patentability on PCT/US2010/060354 dated Jun. 28, 2012.
International Search Report on PCT/US2010/060354 dated Aug. 2, 2011.
Written Opinion on PCT/US2010/060354 dated Aug. 2, 2011.

* cited by examiner

METHODS AND SYSTEMS FOR OPTIMIZING A PROCESS OF ARCHIVING AT LEAST ONE BLOCK OF A VIRTUAL DISK IMAGE

CROSS REFERENCE TO RELATED APPLICATIONS

This application claims priority to U.S. application Ser. No. 61/286,339 entitled "Methods and Systems for Optimizing a Process of Archiving at Least One Block of a Virtual Disk Image" filed Dec. 14, 2009, the entire disclosure of which is incorporated herein by reference in its entirety for any and all purposes.

FIELD OF THE INVENTION

The present disclosure relates to methods and systems for archiving data. In particular, the present disclosure relates to methods and systems for optimizing a process of archiving at least one block of a virtual disk image.

BACKGROUND OF THE INVENTION

In typical environments for executing a virtual machine on a client machine, the client machine accesses a virtual disk image file in order to execute the virtual machine. Conventionally, when a user of the client machine attempts to make a modification that would result in a modification to the virtual disk image file (for example, by attempting to modify operating system data, create new files, or modify existing files), the modification is made instead to a difference disk associated with the virtual disk image file. In some environments, the process of storing an identification of the modification in the difference disk is referred to as generating a snapshot.

In typical environments for archiving the virtual disk image file and any associated difference disks, all of the files are archived. However, generating back-up copies of virtual disk image files and difference disks may be computationally- or resource-intense. For example, the files may require several gigabytes of storage space and to make a copy of that would consume computational resources and storage device resources. Additionally, in some environments, where an archive copy is transmitted over a network to a remote machine, the generation and transmission of the archive copy of the virtual disk image files and difference disks may be inefficient or consume more of the computational resources of the client machine than a conventional user would find desirable.

BRIEF SUMMARY OF THE INVENTION

In one aspect, a method for optimizing a process of archiving at least one block of a virtual disk image includes identifying, by a file system analysis component executing on a first physical computing device, a plurality of blocks storing data comprising a file in a virtual disk image file. The method includes identifying, by an archiving component executing on the first physical computing device, a difference disk file storing an identification of a modification to at least one of the identified plurality of blocks storing data comprising the file. The method includes determining, by the archiving component, whether to archive the file. The method includes transmitting, by the archiving component, to a second physical computing device, the plurality of blocks storing data comprising the file. In some embodiments, the method includes determining, by the archiving component, not to archive the file.

In one embodiment, the method includes: identifying, by the file system analysis component, a second plurality of blocks storing data comprising a second file in the virtual disk image file; identifying, by the archiving component, a second difference disk file storing an identification of a modification to the identified second plurality of blocks storing data comprising the second file; determining, by the archiving component, whether to archive the second file; and determining, by the archiving component, not to transmit, to the second physical computing device, the second plurality of blocks. In another embodiment, the method includes determining whether to archive the file responsive to an application of a filter to the file. In still another embodiment, extracting, from a sector of the virtual disk image file, data identifying a location of a mapping between the file and the plurality of blocks and accessing the mapping to identify the plurality of blocks.

In another aspect, a system for optimizing a process of archiving at least one block of a virtual disk image includes a file system analysis component and an archiving component. The file system analysis component executes on a first physical computing device and identifies a plurality of blocks storing data comprising a file in a virtual disk image file. The archiving component executes on the first physical computing device, identifies a difference disk file storing an identification of a modification to the identified plurality of blocks storing data comprising the file, determines whether to archive the file, and transmits, to a second physical computing device, the plurality of blocks storing data comprising the file.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
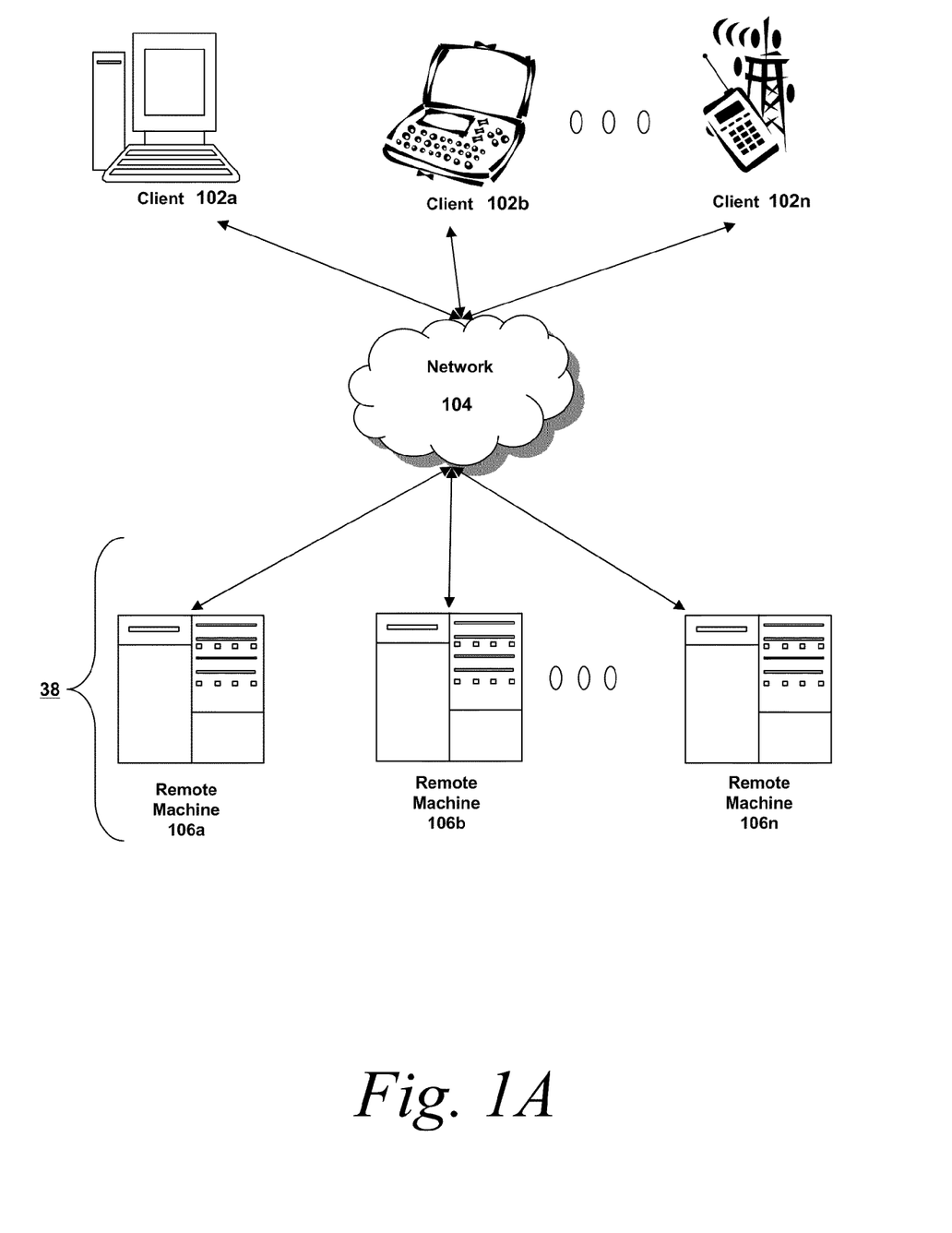
FIG. 1A is a block diagram depicting an embodiment of a network environment comprising local machines in communication with remote machines.

Referring now to FIG. 1A, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1A shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38. In another of these embodiments, the remote machines 106 may be geographically dispersed. In other embodiments, a server farm 38 may be administered as a single entity. In still other embodiments, the server farm 38 comprises a plurality of server farms 38. The remote machines 106 within each server farm 38 can be heterogeneous—one or more of the remote machines 106 can operate according to one type of operating system platform (e.g., WINDOWS NT, WINDOWS 2003, or WINDOWS 2008, all of which are manufactured by Microsoft Corp. of Redmond, Wash.), while one or more of the other remote machines 106 can operate on according to another type of operating system platform (e.g., Unix or Linux).

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm 38. In another embodiment, the local machine 102 executes a program neighborhood application to communicate with a remote machine 106 in a server farm 38. In still another embodiment, the remote machine 106 provides the functionality of a master node. In some embodiments, the local machine 102 communicates with the remote machine 106 in the server farm 38 through a network 104. Over the network 104, the local machine 102 can, for example, request execution of various applications hosted by the remote machines 106a-106n in the server farm 38 and receive output of the results of the application execution for display. In some embodiments, only a master node provides the functionality required to identify and provide address information associated with a remote machine 106b hosting a requested application.

In one embodiment, the remote machine 106 provides the functionality of a web server. In another embodiment, the remote machine 106a receives requests from the local machine 102, forwards the requests to a second remote machine 106b and responds to the request by the local machine 102 with a response to the request from the remote machine 106b. In still another embodiment, the remote machine 106a acquires an enumeration of applications available to the local machine 102 and address information associated with a remote machine 106b hosting an application identified by the enumeration of applications. In yet another embodiment, the remote machine 106 presents the response to the request to the local machine 102 using a web interface.

In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1B:
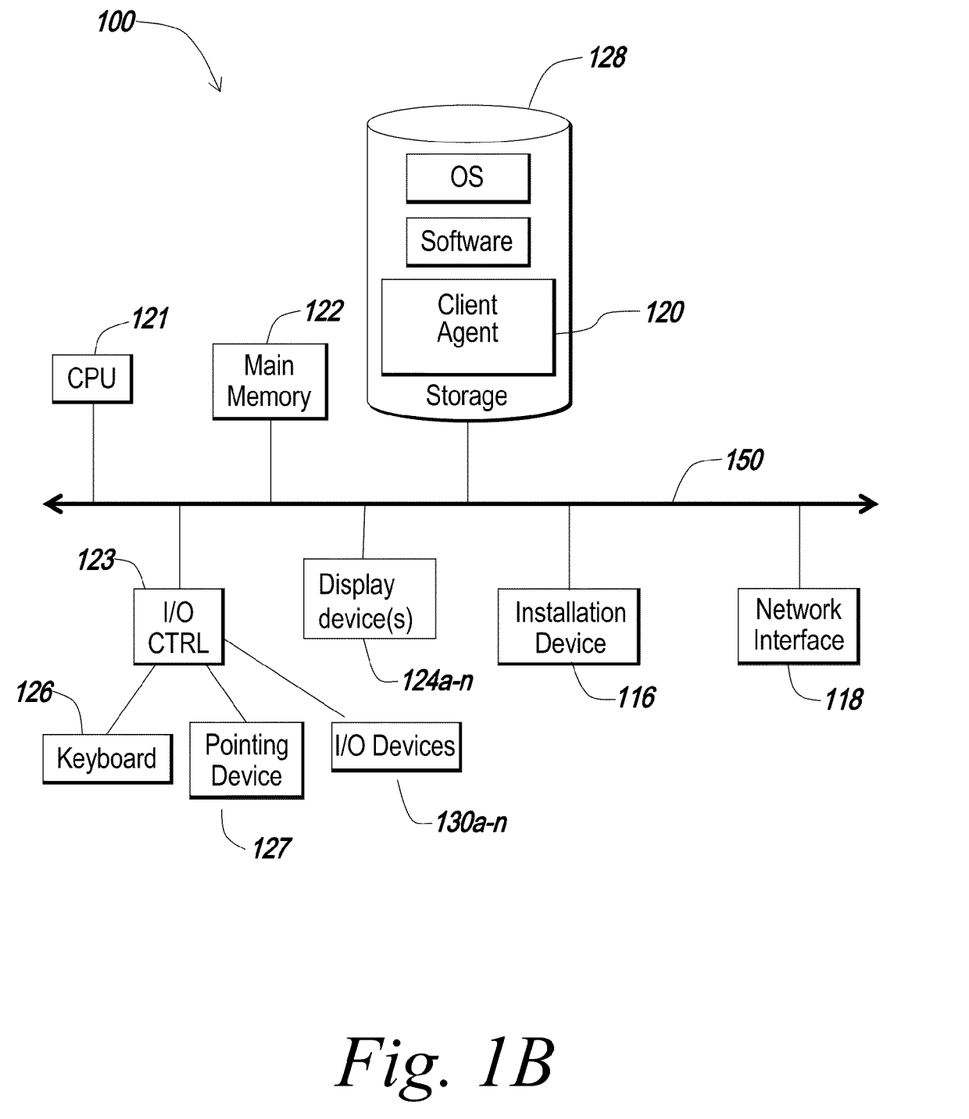
FIGS. 1B-1E are block diagrams depicting embodiments of computers useful in connection with the methods and systems described herein.
Figure 1C:
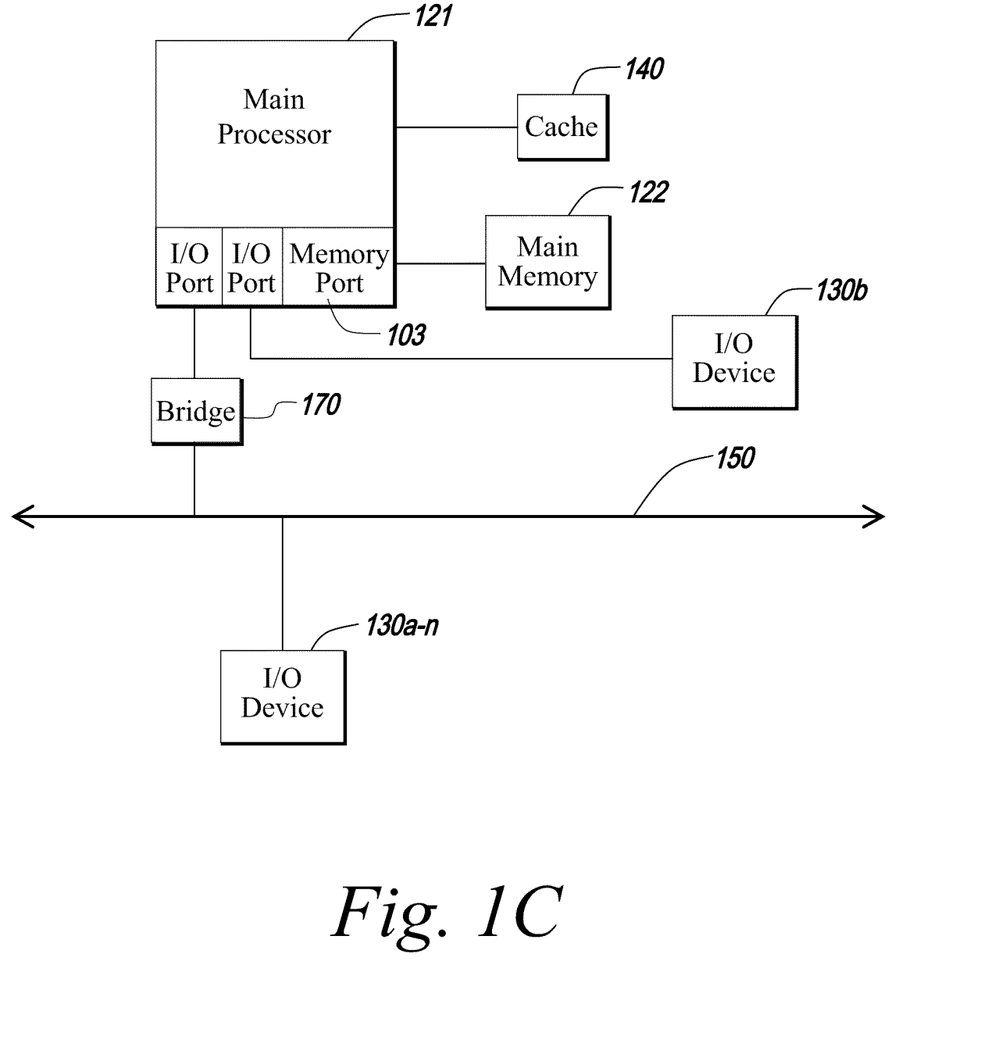

The local machine 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the local machine 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, i576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

Figure 1D:
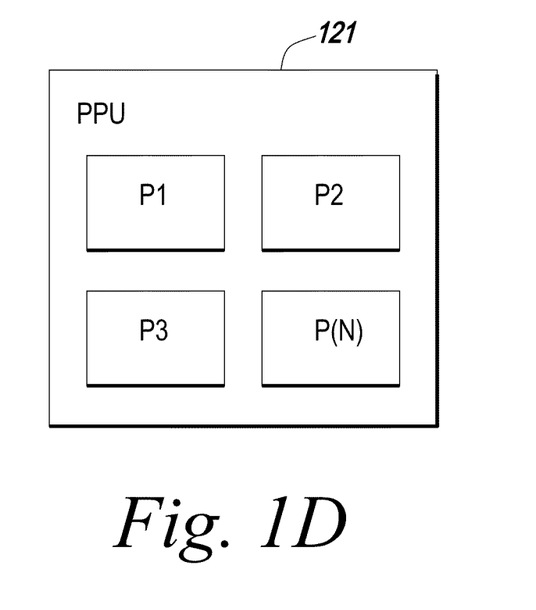

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
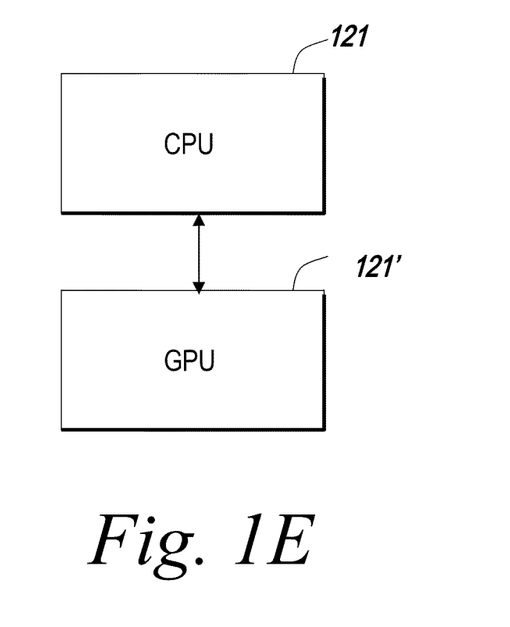

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

Figure 1F:
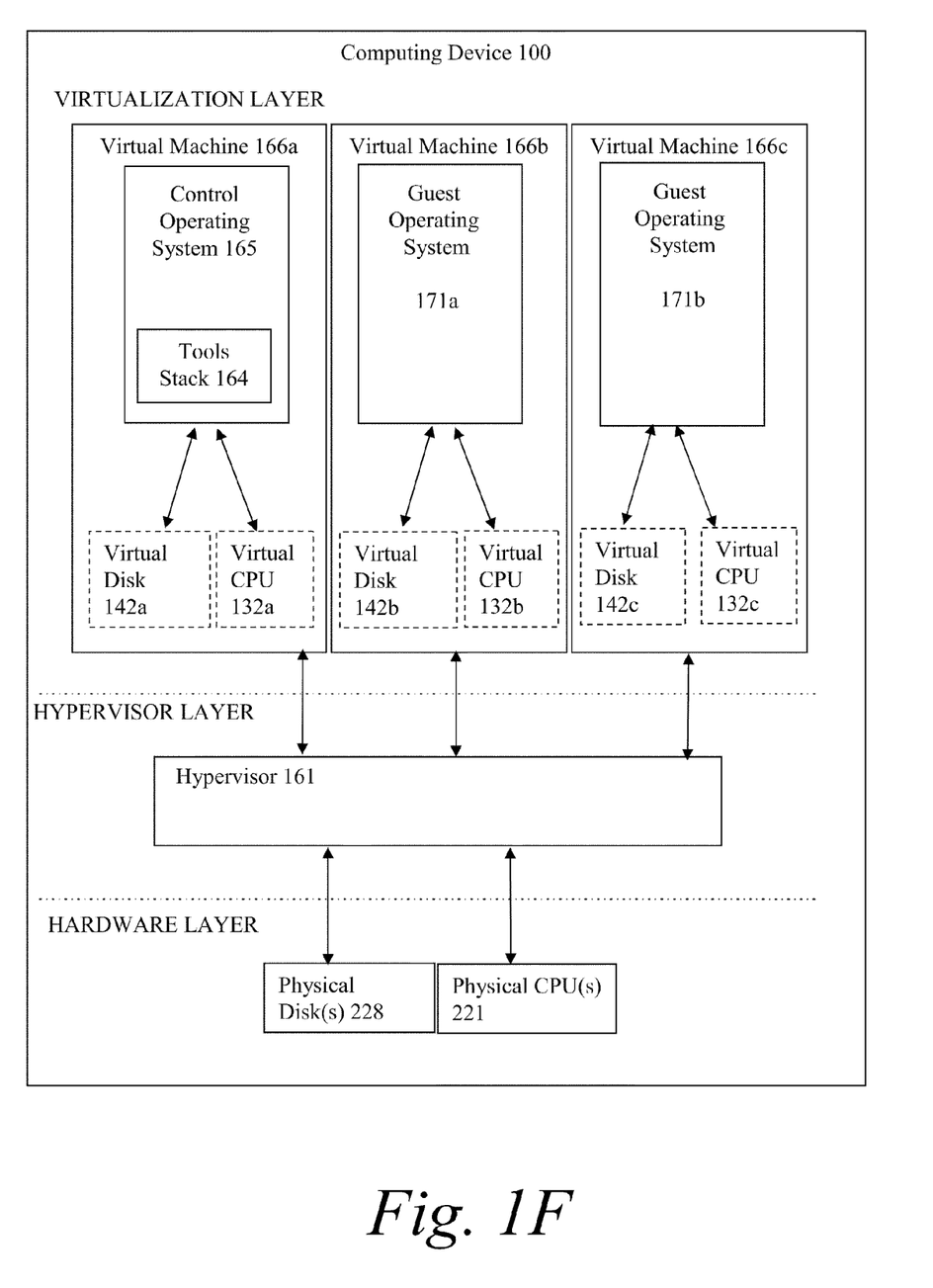
FIG. 1F is a block diagram depicting one embodiment of a virtualization environment.

Referring now to FIG. 1F, a block diagram depicts one embodiment of a virtualization environment. In brief overview, a computing device 100 includes a hypervisor layer, a virtualization layer, and a hardware layer. The hypervisor layer includes a hypervisor 161 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 171 and a plurality of virtual resources allocated to the at least one operating system 171. Virtual resources may include, without limitation, a plurality of virtual processors 132a, 132b, 132c (generally 132), and virtual disks 142a, 142b, 142c (generally 142), as well as virtual resources such as virtual memory and virtual network interfaces. The plurality of virtual resources and the operating system 171 may be referred to as a virtual machine 166. A virtual machine 166 may include a control operating system 165 in communication with the hypervisor 161 and used to execute applications for managing and configuring other virtual machines on the computing device 100.

Referring now to FIG. 1F, and in greater detail, a hypervisor 161 may provide virtual resources to an operating system in any manner that simulates the operating system having access to a physical device. A hypervisor 161 may provide virtual resources to any number of guest operating systems 171a, 171b (generally 171). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor which creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 161 executes within an operating system executing on a computing device. In one of these embodiments, a computing device executing an operating system and a hypervisor 161 may be said to have a host operating system (the operating system executing on the computing device), and a guest operating system (an operating system executing within a computing resource partition provided by the hypervisor 161). In other embodiments, a hypervisor 161 interacts directly with hardware on a computing device, instead of executing on a host operating system. In one of these embodiments, the hypervisor 161 may be said to be executing on "bare metal," referring to the hardware comprising the computing device.

In some embodiments, a hypervisor 161 may create a virtual machine 166a-c (generally 166) in which an operating system 171 executes. In one of these embodiments, for example, the hypervisor 161 loads a virtual machine image to create a virtual machine 166. In another of these embodiments, the hypervisor 161 executes an operating system 171 within the virtual machine 166. In still another of these embodiments, the virtual machine 166 executes an operating system 171.

In some embodiments, the hypervisor 161 controls processor scheduling and memory partitioning for a virtual machine 166 executing on the computing device 100. In one of these embodiments, the hypervisor 161 controls the execution of at least one virtual machine 166. In another of these embodiments, the hypervisor 161 presents at least one virtual machine 166 with an abstraction of at least one hardware resource provided by the computing device 100. In other embodiments, the hypervisor 161 controls whether and how physical processor capabilities are presented to the virtual machine 166.

A control operating system 165 may execute at least one application for managing and configuring the guest operating systems. In one embodiment, the control operating system 165 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 161 executes the control operating system 165 within a virtual machine 166 created by the hypervisor 161. In still another embodiment, the control operating system 165 executes in a virtual machine 166 that is authorized to directly access physical resources on the computing device 100. In some embodiments, a control operating system 165a on a computing device 100a may exchange data with a control operating system 165b on a computing device 100b, via communications between a hypervisor 161a and a hypervisor 161b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 165 executes in a virtual machine 166 that is authorized to interact with at least one guest operating system 171. In another embodiment, a guest operating system 171 communicates with the control operating system 165 via the hypervisor 161 in order to request access to a disk or a network. In still another embodiment, the guest operating system 171 and the control operating system 165 may communicate via a communication channel established by the hypervisor 161, such as, for example, via a plurality of shared memory pages made available by the hypervisor 161.

In some embodiments, the control operating system 165 includes a network back-end driver for communicating directly with networking hardware provided by the computing device 100. In one of these embodiments, the network back-end driver processes at least one virtual machine request from at least one guest operating system 171. In other embodiments, the control operating system 165 includes a block back-end driver for communicating with a storage element on the computing device 100. In one of these embodiments, the block back-end driver reads and writes data from the storage element based upon at least one request received from a guest operating system 171.

In one embodiment, the control operating system 165 includes a tools stack 164. In another embodiment, a tools stack 164 provides functionality for interacting with the hypervisor 161, communicating with other control operating systems 165 (for example, on a second computing device 100b), or managing virtual machines 166b, 166c on the computing device 100. In another embodiment, the tools stack 164 includes customized applications for providing improved management functionality to an administrator of a virtual machine farm. In some embodiments, at least one of the tools stack 164 and the control operating system 165 include a management API that provides an interface for remotely configuring and controlling virtual machines 166 running on a computing device 100. In other embodiments, the control operating system 165 communicates with the hypervisor 161 through the tools stack 164.

In one embodiment, the hypervisor 161 executes a guest operating system 171 within a virtual machine 166 created by the hypervisor 161. In another embodiment, the guest operating system 171 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 171, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 161; in such an embodiment, the driver is typically aware that it executes within a virtualized environment.

In another embodiment, the guest operating system 171, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 165, as described above.

Figure 2:
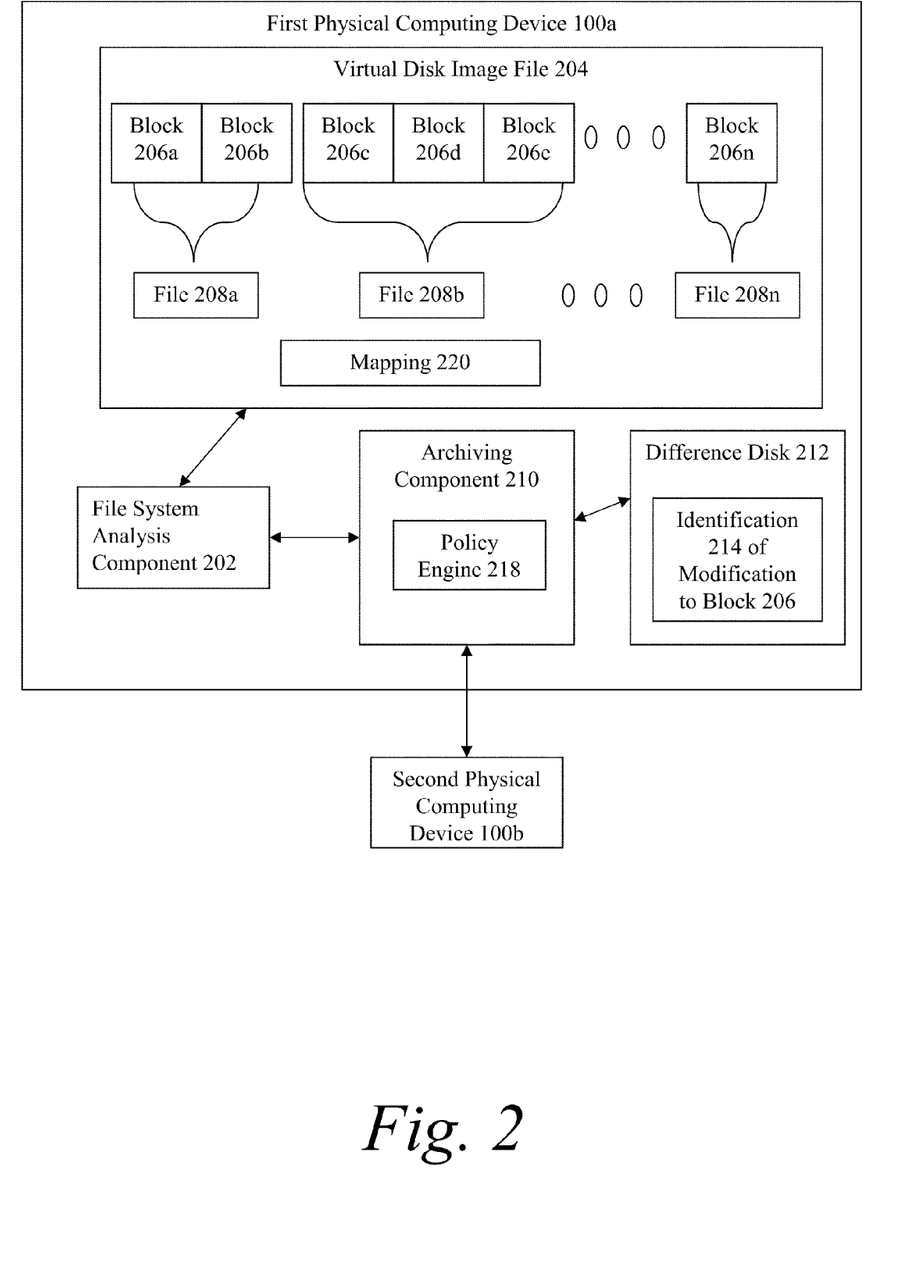
FIG. 2 is a block diagram depicting one embodiment of a system for optimizing a process of archiving at least one block of a virtual disk image.

Referring now to FIG. 2, a block diagram depicts one embodiment of a system for optimizing a process of archiving at least one block of a virtual disk image. In brief overview, the system includes a file system analysis component 202 and an archiving component 210. The file system analysis component 202 executes on a first physical computing device 100a. The file system analysis component 202 identifies a plurality of blocks 206 storing data comprising a file 208 in a virtual disk image file 204. The archiving component 210 executes on the first physical computing device 100a. The archiving component 210 identifies a difference disk file 212 storing an identification 214 of a modification to the identified plurality of blocks 206 storing data comprising the file 208. The archiving component 210 determines whether to archive the file 208. The archiving component 210 transmits, to a second physical computing device 100b, the plurality of blocks 206 storing data comprising the file 208. In some embodiments, the archiving component 210 determines not to archive the file, responsive to an application of a filter to at least one of: an identification of the file and an identification of a modification to a block storing data related to or forming the file.

In some embodiments, a system analyzes a file within a virtual disk image file to determine whether or not to archive the file. In one of these embodiments, an analysis indicates that the file has been modified, deleted, or otherwise made obsolete. In another of these embodiments, an analysis of a file name, a file type or other identifier of the file results in a determination that the file should not be archived. In some embodiments of the methods and systems described herein, by analyzing the blocks comprising files in a virtual disk image file and making a determination as to whether or not to archive all of the blocks for all of the files, the methods and systems described herein provide data back-up functionality and efficient archiving of relevant blocks of data.

In one embodiment, the system includes a component that identifies and removes unused blocks from a virtual disk image file prior to archiving the file. In another embodiment, the system includes a component that identifies and removes blocks that are not to be archived from a virtual disk image file prior to archiving the file; for example, the system may access an enumeration of file names or file types that are not to be archived and remove blocks that store data for files identified in the enumeration. In still another embodiment, the system includes a component that compresses the remaining data prior to archiving the virtual disk image file.

Referring now to FIG. 2, and in greater detail, the file system analysis component 202 includes a parser for analyzing a virtual disk image file 204 and identifying a plurality of blocks 206 storing data comprising a file 208. In one embodiment, the file system analysis component 202 includes functionality for identifying a second plurality of blocks 206b storing data comprising a second file 208b in the virtual disk image file 204.

In one embodiment, a plurality of blocks 206 is referred to as a cluster. In another embodiment, a block 206a in the plurality of blocks 206 is referred to as a sector. In still another embodiment, however, a block includes a plurality of sectors. In still even another embodiment, a block has a size of 2 MB. In yet another embodiment, the virtual disk image file 204 has a file format such as the Virtual Hard Disk (VHD) file format distributed by Microsoft Corp. of Redmond, Wash., or the Virtual Machine Disk (VMDK) file format distributed by VMware, Inc., of Palo Alto, Calif.

In some embodiments, the archiving component 210 includes a policy engine 218. In one of these embodiments, the archiving component 210 executes the policy engine 218 to make a determination regarding whether to archive a file. In another of these embodiments, the policy engine 218 includes at least one filter for determining whether to archive a file. In other embodiments, the archiving component 210 accesses data stored in a database to determine whether or not to archive a file. In still other embodiments, the archiving component 210 accesses a regular expressional analysis component to filter out files that are not to be archived. In one of these embodiments, the archiving component 210 includes the functionality of the regular expressional analysis component. Although described in FIG. 2 as separate components, in some embodiments, a single component provides the functionality of the archiving component 210 and the file system analysis component 202.

Figure 3:
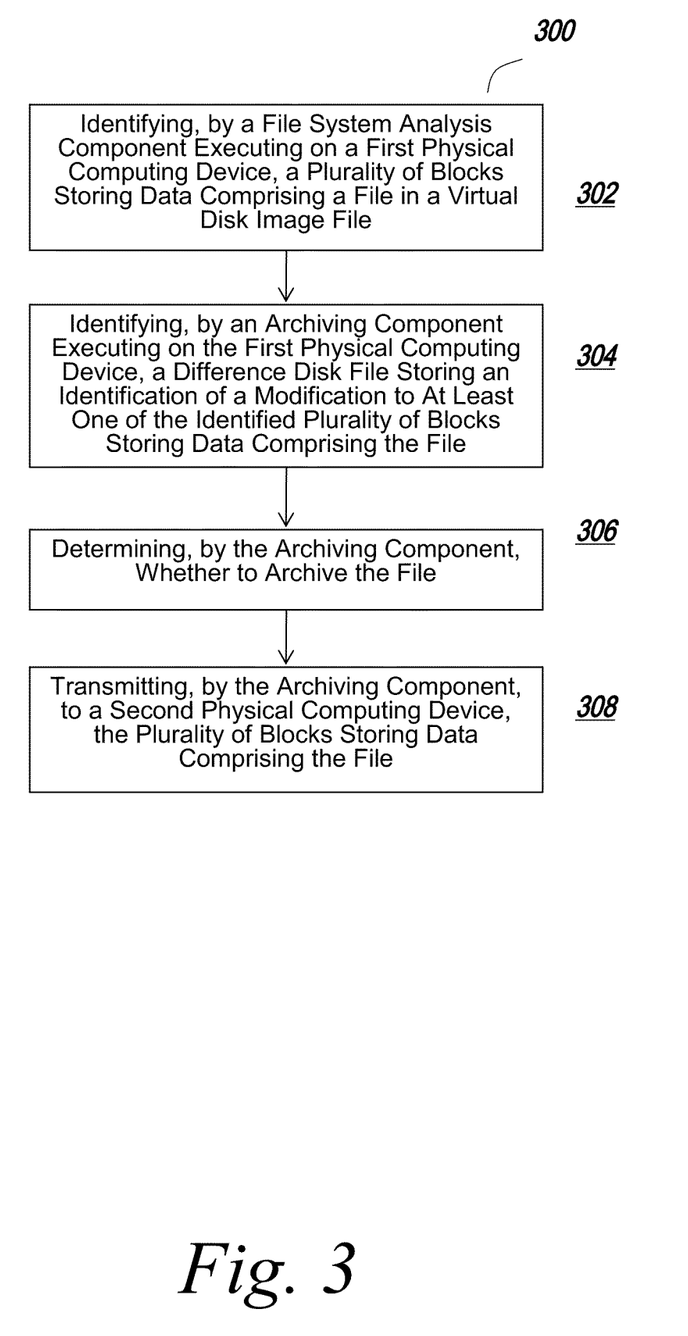
FIG. 3 is a flow diagram depicting one embodiment of a method for optimizing a process of archiving at least one block of a virtual disk image.

Referring now to FIG. 3, a flow diagram depicts one embodiment of a method for optimizing a process of archiving at least one block of a virtual disk image. In brief overview, the method 300 includes identifying, by a file system analysis component executing on a first physical computing device, a plurality of blocks storing data comprising a file in a virtual disk image file (302). The method includes identifying, by an archiving component executing on the first physical computing device, a difference disk file storing an identification of a modification to at least one of the identified plurality of blocks storing data comprising the file (304). The method includes determining, by the archiving component, whether to archive the file (306). The method includes transmitting, by the archiving component, to a second physical computing device, the plurality of blocks storing data comprising the file (308). In some embodiments, the method includes determining, by the archiving component, not to archive the plurality of blocks.

Referring now to FIG. 3, and in greater detail, the file system analysis component executing on the first physical computing device identifies a plurality of blocks storing data comprising a file in a virtual disk image file (302). In some embodiment, the file system analysis component 202 extracts, from a block of the virtual disk image file 204, a listing of logical drives (which may also be referred to as volumes) made accessible by the virtual disk image file 204. In one of these embodiments, the listing of logical drives identifies a location of a boot sector for one or more logical drives; the boot sector may be a sector that stores executable data with which a logical drive may be made available to a user of the first physical computing device 100a. In another of these embodiments, the file system analysis component 202 extracts, from the identified boot sector, data identifying a location of a mapping 220 between a file 208 and a plurality of blocks 206 storing the data that comprises the file 208; the mapping 220 may be referred to as a master file table. In still another embodiment, the file system analysis 202 stores a copy of the mapping 220. In yet another embodiment, the file system analysis component 202 accesses the mapping 220 to identify the plurality of blocks 206 storing the file 208. In some embodiments, the file system analysis component 202 transmits an identification of the location of the mapping 220 to the archiving component 210.

In other embodiments, the file system analysis component 202 generates a second mapping 222 based upon an analysis of data in the mapping 220. In one of these embodiments, the file system analysis component 202 generates a second mapping 222 that associates a plurality of blocks 206 with the file 208. In another of these embodiments, the second mapping 222 is an inverse of the mapping 220 providing functionality for identifying a file name based on an identification of one or more blocks of data.

The archiving component executing on the first physical computing device identifies a difference disk file storing an identification of a modification to at least one of the identified plurality of blocks storing data comprising the file (304). In one embodiment, the difference disk file 212 includes a reference to the virtual disk image file 204.

In one embodiment, the archiving component 210 receives a copy of the mapping 222 from the file system analysis component 202. In another embodiment, the archiving component 210 receives an identification of a location of a block storing the mapping 222. In still another embodiment, the archiving component 210 receives, from the file system analysis component 202, an identification of a plurality of blocks 206 and an identification of a file 208 (e.g., a file name), the plurality of blocks 206 storing data comprising the file 208.

In one embodiment, the archiving component 210 analyzes the data stored by the difference disk 212 to determine whether the difference disk file 212 stores an identification 214 of a modification to the plurality of blocks 206 that the file system analysis component 202 identified. In another embodiment, the archiving component 210 extracts data from the difference disk file 212 and determines whether the data includes an identification that matches the identification 214. In still another embodiment, the archiving component 210 determines that the difference disk 212 stores an identification of a modification to the plurality of blocks 206. In yet another embodiment, the archiving component 210 retrieves the identification of the file 208 (e.g., a file name received from the file system analysis component 202). In some embodiments, the file system analysis component 202 and the archiving component 210 together provide the functionality typically provided by file system drivers and other components. In one of these embodiments, therefore, the archiving component 210 can determine whether the difference disk file 212 includes a modification to a file originally stored in the virtual disk image file 204 without mounting either the difference disk file 212 or the virtual disk image file 204.

In some embodiments, the archiving component 210 accesses a data structure that stores an indication of each file 208 that has changed in a given time period. In other embodiments, the archiving component 210 accesses a data structure that stores an indication of whether a file 208 has changed in a given time period. In still other embodiments, the difference disk file 212 stores such a data structure. In other embodiments, however, the virtual disk image file 204 stores the data structure. In one of these embodiments, the archiving component 210 does not need to analyze the difference disk 212 and can, instead, access the data structure stored by the virtual disk image file 204. In further embodiments, such a data structure may be provided—by way of example—as a structure referred to as an Update Sequence Number (USN) or Change Journal. In one of these embodiments, the data structure is generated by a recording function that records in the data structure each change that occurred in the virtual disk image file 204.

The archiving component determines whether to archive the file (306). In one embodiment, the archiving component 210 determines whether to archive the file 208 responsive to an application of a filter to an identification of the file 208; for example, the archiving component 210 may determine whether or not to archive the file 208 based on all or part of a file name. In another embodiment, the archiving component 210 determines whether to archive the file 208 responsive to an application of a filter to an identification of the difference disk 212; for example, the archiving component 210 may determine whether or not to archive the file 208 based on a time of creation of the difference disk 212. In still another embodiment, the archiving component 210 determines whether to archive the file 208 responsive to an application of a filter to an identification 214, stored by the difference disk 212, of a modification to the plurality of blocks 206; for example, the archiving component 210 may determine whether or not to archive the file 208 based on a type of modification made to the file. In still even another embodiment, the archiving component 210 determines not to archive files for which an identification 214 indicates that the file is to be deleted. In yet another embodiment, the archiving component 210 determines whether to archive the file 208 responsive to a determination by a policy engine 218 regarding whether to archive the file 208.

In some embodiments, the archiving component 210 determines not to archive files identified as having a particular file type. In one of these embodiments, by way of example, the archiving component 208 may apply a policy and determine not to archive template files or temporary files. In another of these embodiments, the archiving component 208 may apply a policy and determine not to archive page files. In still another of these embodiments, the archiving component 208 may apply a policy and determine not to archive hibernation files. In still even another of these embodiments, the archiving component 208 may apply a policy and determine not to archive a file specific to an execution of the virtual disk image file 204 on the first physical computing device 100*a*. In other embodiments, the archiving component 208 accesses an enumeration of file types that are not to be archived. In still other embodiments, the archiving component 208 accesses an enumeration of file names for which the associates files are not to be archived. In further embodiments, and by way of example, data stored within a registry stored by the virtual disk image file 204 that includes an enumeration of files that are not to be archived.

In some embodiments, the archiving component 210 determines not to archive the file 208 because an analysis of the identification 214 of the modification to block 206 indicates that the modification has made the original file obsolete. In one of these embodiments, the archiving component 210 determines to archive a second plurality of blocks stored by the difference disk 212 instead of the plurality of blocks 206 stored by the virtual disk image file 204. In another of these embodiments, the archiving component 210 determines to archive a second plurality of blocks 206*b* stored by the virtual disk image file 204 instead of the initially identified plurality of blocks 206*a*.

The archiving component transmits, to a second physical computing device, the plurality of blocks storing data comprising the file (308). In one embodiment, the archiving component 210 transmits the plurality of blocks 206 to the second physical computing device 100*b* responsive to a determination to archive the file 208. In another embodiment, the archiving component 210 determines not to transmit the plurality of blocks 206, responsive to a determination not to archive the file 208. In still another embodiment, the archiving component 210 transmits a plurality of blocks storing data comprising a modification to the file 208, the plurality of blocks identified by the identification 214. In some embodiments, the archiving component 210 transmits the plurality of blocks 206 as a virtual disk image file having a format substantially similar to a format of the virtual disk image file 204. In one of these embodiments, by transmitting a file with a substantially similar format as the format of the original virtual disk image file 204—instead of, for example, transmitting a file having a substantially distinct format—the archiving component 210 eliminates the need for a user requesting access to the transmitted plurality of blocks to re-format the transmitted plurality of blocks in order to access the transmitted plurality of blocks.

In some embodiments of the methods and systems described herein, by analyzing the blocks comprising files in the virtual disk image file 204 and making a determination as to whether or not to archive all of them, the methods and systems described provide data back-up functionality and efficient archiving of relevant blocks of data.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable nonvolatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for optimizing a process of archiving at least one block of a virtual disk image, it will now become apparent to one of skill in the art that other embodiments incorporating the concepts of the invention may be used. Therefore, the disclosure should not be limited to certain embodiments, but rather should be limited only by the spirit and scope of the following claims.

What is claimed is:

1. A method for optimizing a process of archiving at least one block of a virtual disk image, the method comprising:
    identifying, by a file system analysis component executing on a first physical computing device, a plurality of blocks storing data comprising a file in an unmounted virtual disk image file;
    identifying, by an archiving component executing on the first physical computing device, a difference disk file storing an identification of a modification to at least one of the identified plurality of blocks storing data comprising the file;
determining a first determination, by the archiving component, responsive to the identification of the modification to the at least one of the identified plurality of blocks, that the file is obsolete;
transmitting, by the archiving component, responsive to the first determination, to a second physical computing device, at least one block of a second plurality of blocks stored by the difference disk, the at least one block of the second plurality of blocks storing data comprising an updated copy of the file;
identifying, by the archiving component executing on the first physical computing device, a third plurality of blocks storing data comprising a second file in the unmounted virtual disk image file;
determining a second determination, by the archiving component responsive to an identification of a modification to at least one of the identified third plurality of blocks, that the second file is not obsolete; and
transmitting, by the archiving component responsive to the second determination, at least one block of the third plurality of blocks storing data comprising the second file to the second physical computing device from the unmounted virtual disk image.

2. The method of claim 1, wherein determining the first determination further comprises determining whether or not to archive the file responsive to an application of a filter to the file.

3. The method of claim 1, wherein determining the first determination further comprises determining whether or not to archive the file responsive to identifying the difference disk file.

4. The method of claim 1 further comprising extracting, from a sector of the virtual disk image file, data identifying a location of a mapping between the file and the plurality of blocks.

5. The method of claim 4 further comprising accessing the mapping to identify the plurality of blocks.

6. A system for optimizing a process of archiving at least one block of a virtual disk image comprising:
a file system analysis component executing on a first physical computing device and identifying a plurality of blocks storing data comprising a file in an unmounted virtual disk image file; and
an archiving component executing on the first physical computing device, identifying a difference disk file storing an identification of a modification to the identified plurality of blocks storing data comprising the file, determining a first determination responsive to the identification of the modification to the at least one of the identified plurality of blocks, that the file is obsolete, transmitting, responsive to the first determination, to a second physical computing device, at least one block of a second plurality of blocks stored by the difference disk, the at least one block of the second plurality of blocks storing data comprising an updated copy of the file, identifying a third plurality of blocks storing data comprising a second file in the unmounted virtual disk image file, determining a second determination responsive to an identification of a modification to at least one of the identified third plurality of blocks that the second file is not obsolete, and transmitting at least one block of the third plurality of blocks storing data comprising the second file to the second physical computing device from the unmounted virtual disk image.

7. A system for optimizing a process of archiving at least one block of a virtual disk image comprising:
means for identifying, by a file system analysis component executing on a first physical computing device, a plurality of blocks storing data comprising a file in an unmounted virtual disk image file;
means for identifying, by an archiving component executing on the first physical computing device, a difference disk file storing an identification of a modification to at least one of the identified plurality of blocks storing data comprising the file;
means for determining a first determination, by the archiving component, responsive to the identification of the modification to the at least one of the identified plurality of blocks, that the file is obsolete;
means for transmitting, by the archiving component, responsive to the first determination, to a second physical computing device, at least one block of a second plurality of blocks stored by the difference disk, the at least one block of the second plurality of blocks storing data comprising an updated copy of the file;
means for identifying, by the archiving component executing on the first physical computing device, a third plurality of blocks storing data comprising a second file in the unmounted virtual disk image file;
means for determining a second determination, by the archiving component responsive to an identification of a modification to at least one of the identified third plurality of blocks, that the second file is not obsolete; and
means for transmitting, by the archiving component responsive to the second determination, at least one block of the third plurality of blocks storing data comprising the second file to the second physical computing device from the unmounted virtual disk image.

8. The system of claim 7 further comprising means for determining whether or not to archive the file responsive to an application of a filter to the file.

9. The system of claim 7 further comprising means for determining whether or not to archive the file responsive to identifying the difference disk file.

10. The system of claim 7 further comprising means for extracting, from a sector of the virtual disk image file, data identifying a location of a mapping between the file and the plurality of blocks.

11. The system of claim 10 further comprising means for accessing the mapping to identify the plurality of blocks.

12. The method of claim 1, further comprising:
identifying, by the file system analysis component, a fourth plurality of blocks storing data comprising a third file in the unmounted virtual disk image file;
identifying, by the archiving component, a second difference disk file storing an identification of a modification to the identified fourth plurality of blocks storing data comprising the third file;
determining a third determination, by the archiving component, whether or not to archive the third file; and
not transmitting, by the archiving component, responsive to the third determination, to the second physical computing device, the fourth plurality of blocks.

13. The system of claim 6, wherein the archiving component is further configured to:
identify a fourth plurality of blocks storing data comprising a third file in the unmounted virtual disk image file;
identify a second difference disk file storing an identification of a modification to the identified fourth plurality of blocks storing data comprising the third file;

determine a third determination whether or not to archive the third file; and not transmit responsive to the third determination, to the second physical computing device, the fourth plurality of blocks.

14. The system of claim 7, further comprising:

a means for identifying a fourth plurality of blocks storing data comprising a third file in the unmounted virtual disk image file;

a means for identifying a second difference disk file storing an identification of a modification to the identified fourth plurality of blocks storing data comprising the third file;

a means for determining a third determination whether or not to archive the third file; and a means for not transmitting responsive to the third determination, to the second physical computing device, the fourth plurality of blocks.

* * * * *